United States Patent [19]

Kirk, Jr. et al.

[11] 3,773,979

[45] Nov. 20, 1973

[54] MULTIPLEXED VIDEO AND SUBCARRIER MICROWAVE COMMUNICATIONS SYSTEM

[75] Inventors: Donald Kirk, Jr.; Michael J. Paolini, both of Petersbury, Fla.

[73] Assignee: Digital Communications Inc., St. Petersburg, Fla.

[22] Filed: Mar. 30, 1972

[21] Appl. No.: 239,629

[52] U.S. Cl. ........... 179/15 FD, 179/15 BM, 325/48
[51] Int. Cl. ........................................... H04j 1/20
[58] Field of Search ...................... 178/67, DIG. 23, 178/66; 325/30, 48; 179/15 FD, 15 BM; 307/262; 332/17, 18, 21; 340/207

[56] References Cited

UNITED STATES PATENTS

| | | | |
|---|---|---|---|
| 3,317,838 | 5/1967 | Ham | 325/48 |
| 2,708,716 | 5/1955 | Boothroyd | 325/48 |
| 2,986,597 | 5/1961 | Teer | 179/15 FD |
| 3,659,041 | 4/1972 | Kitaoka | 178/DIG. 23 |
| 3,659,053 | 4/1972 | Low | 179/15 FD |

OTHER PUBLICATIONS

Telecommunications; "Spectrum Control in a Four—Phase PM Modem"; R. J. Tarry; April 1968; pp. 27–30.

Principles of Communication Engineering; Wozencraft et al.; Published by John Wiley & Sons, Inc., New York; copyright 1965; p. 527.

*Primary Examiner*—Kathleen H. Claffy
*Assistant Examiner*—David L. Stewart
*Attorney*—Nichol M. Sandoe et al.

[57] ABSTRACT

A microwave communications system propagates video information and a high grade wide band subcarrier channel notwithstanding substantial differential phase and differential gain (system nonlinearities) exhibited by the microwave transmitter. The supplementary information is quantized (if not already digital in form), and is employed to differentially modulate (in discrete increments given by multiples of $\pi/2$) the phase of a quadraphase carrier, i.e., in a non-return to zero mode of operation.

At the receiver, the modulated subcarrier spectrum is recovered by filtering, and the subcarrier information recovered by comparing the subcarrier phase difference between consecutive time slots. Since the absolute amplitude of differential phase varies slowly at the transmitter vis-a-vis the subcarrier modulation frequency (substantially 15.734 kHz versus several hundred thousand Hz, or several megacycles), error-free subcarrier demodulation may be effected even in systems exhibiting large differential phase variations.

18 Claims, 14 Drawing Figures

TRANSMITTER

MULTIPLEXED VIDEO AND SUBCARRIER MICROWAVE COMMUNICATIONS SYSTEM

DISCLOSURE OF INVENTION

This invention relates to electronic communications and, more specifically, to a microwave carrier system for providing high grade multiplexed video and wide band supplementary communications channels.

Microwave point-to-point carrier equipment has been extensively employed to propagate video signals. Typically, the bandwidth of the carrier apparatus is significantly greater, by factors approaching 2:1, than the 4.5 mHz required to convey a single television program. This extra bandwidth of the microwave transmission structure — sometimes exceeding 5 mHz, has gone largely unused for any purpose. When employed at all, as in isolated instances where a system internal order wire, or fault reporting or other subcarrier channel has been implemented, only a very small part of the excess system bandwidth has been put to use. And all this, when extra communications capacity (and its concomittant extra revenues) is an economic desideratum for the proprietors of such mircowave systems.

The reason for this at best sparse use of existing bandwidth capacity is the nonlinearities characterizing microwave equipment, principally differential phase and gain, which severely limit the achievable signal-to-noise performance of any FM (frequency modulation) or AM (amplitude modulation) subcarrier channel. More specifically and with reference to FIG. 1, the operative transfer characteristic 100 (gain and phase) of active microwave modulator-power amplifiers, e.g., a klystron, essentially comprise the center portion of a shunt resonant circuit response, and are thus non-uniform with frequency. That is, the microwave active element exhibits operative signal gain and phase parameters which vary with the frequency of the wave being processed by the device. Thus, as the microwave element is deviated in frequency (i.e., frequency modulated) with the carrier modulating intelligence 16 — principally (or, in the prior art, essentially exclusively) the video signal to which most of the microwave carrier FM deviation is allotted, the instantaneous gain and phase operating condition characteristic for the composite microwave apparatus varies (so called differential gain and phase distortion). These gain and phase variations cyclically recur at the 15.734 kHz video line rate (with its always present large amplitute synchronizing pulses) as the video signal deviates the active microwave element, thereby essentially determining its instantaneous operating point. Thus, compare the microwave response to conditions 17–12, and 18–14 in FIG. 1.

FIG. 2 contains graphs depicting the relative amplitude of the 15.734 kHz side bands that are produced if a single frequency sinusoid (e.g., a subcarrier) is introduced in the modulator deviating signal. The sidebands due to differential gain limit the performance of an AM subcarrier, and the sidebands caused by differential phase limit the performance of an FM or PM (phase modulated) subcarrier channel. Thus, for example, even a system of reasonable quality, exhibiting a differential phase and gain of only 4° and 0.4db, would have spurious sidebands less than 40 db down from the subcarrier — thus, without more, obviating the provision of high grade subcarrier supplementary information propagation.

It is thus an object of the present invention to provide an improved communications system.

More specifically, it is an object of the present invention to provide a microwave system for propagating multiplexed video and supplementary wideband signals.

The above and other objects of the present invention are realized in a specific, illustrative microwave carrier communications system for conveying multiplexed video and supplementary information. At the transmitter, the wideband supplementary information is first converted to digital form. Thus, for example, where the supplementary or subcarrier channel information contains plural audio range signals (telephony, AM radio or the like), each such analog signal is sampled, converted into digital form, and time division multiplexed to form a high rate binary digit stream.

The binary information is used to modulate the phase of quadraphase sinusoidal subcarrier. The modulated subcarrier is then linearly combined with the much larger video program to frequency deviate the microwave main carrier for signal propagation.

At the receiver, the modulated subcarrier is recovered by main carrier FM demodulation and filtering, and transmitter-receiver clock synchronization effected by a phase locked loop operating on an amplitude modulation imparted to the subcarrier at the transmitter. The binary information is recovered by comparing the phase difference of the subcarrier between consecutive time slots.

During such consecutive periods, the differential phase property of the transmitter — no matter how large in absolute amount — is essentially constant (compare a subcarrier modulation bit rate of several megacycles and the only 15.734 kHz principal klystron operating point variation at the video line rate). Subcarrier demodulation is thus relatively insensitive to differential phase at the microwave transmitter, and a high grade subcarrier channel is provided.

Finally, at the receiver, the time division signals are separated and reconstituted to their original analog form (if in fact analog and not digital in the first instance).

The above and other features and advantages of the present invention are more fully described in conjunction with a specific illustrative multiplex communication system set forth in detail below, and depicted in an accompanying drawing in which.

Figure 4A:
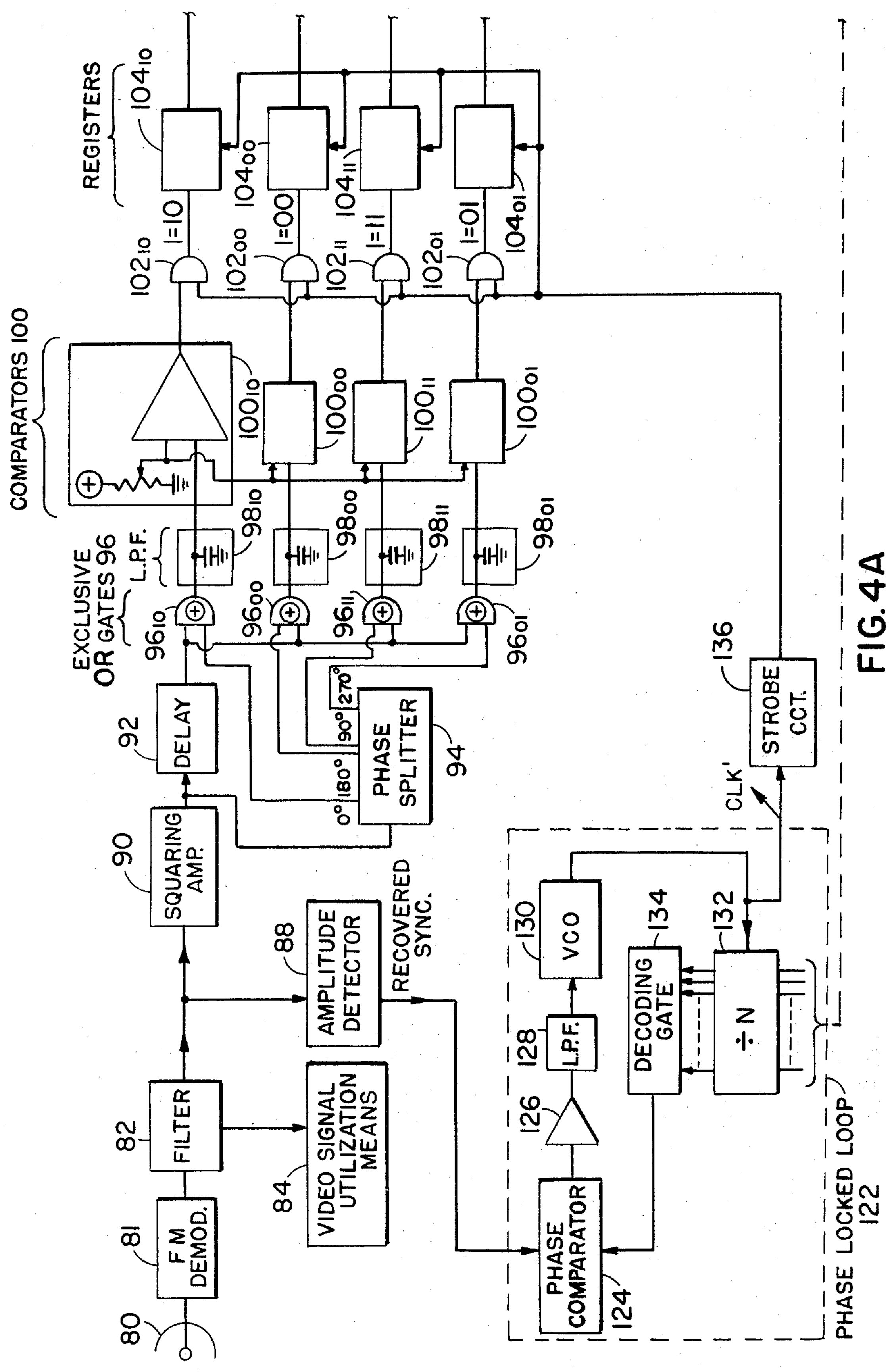
Figure 4B:
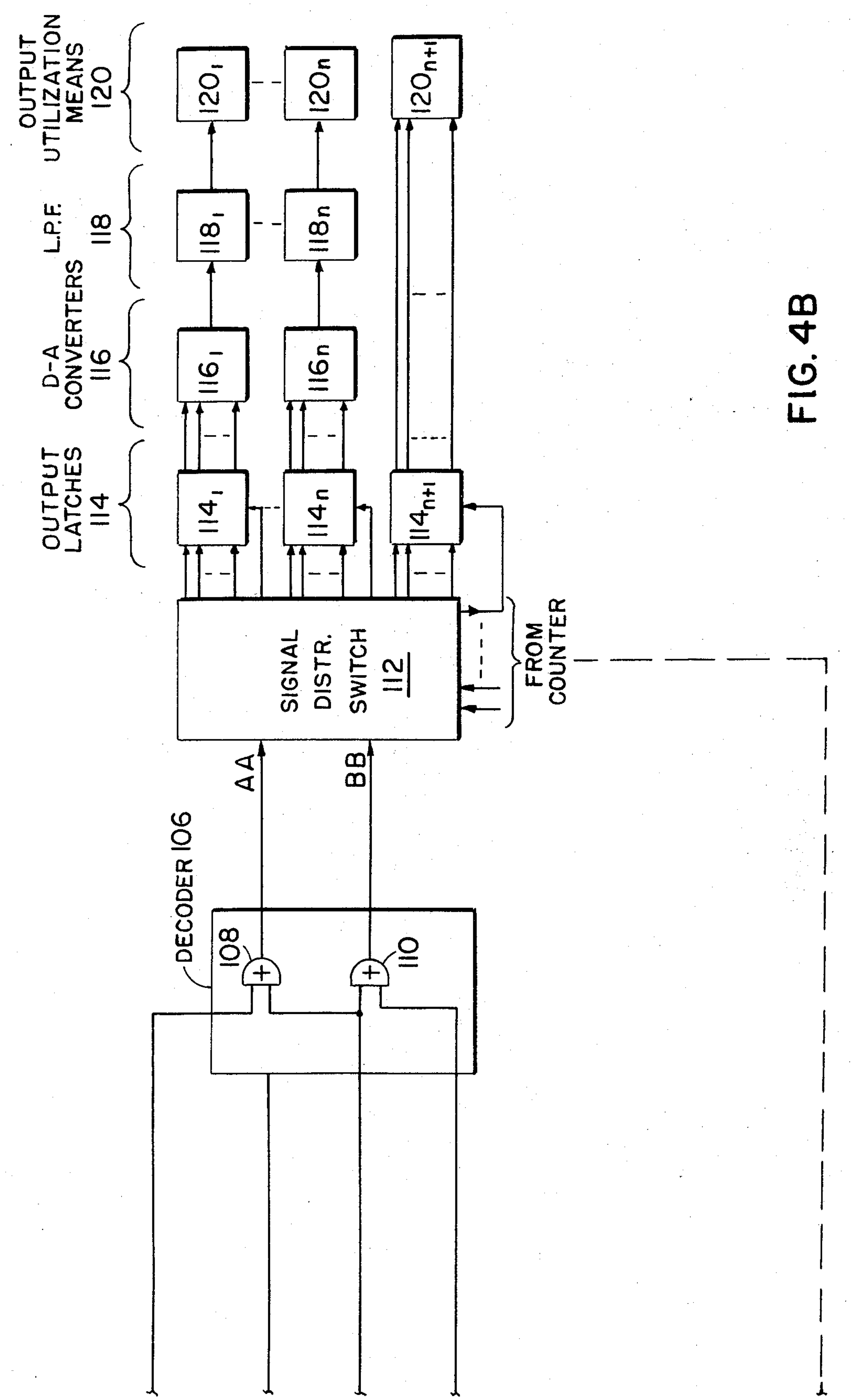

FIGS. 4A and 4B (herein after referred to as composite FIG. 4) illustrate the right and left portions of receiver apparatus in accordance with the principles of the present invention; and FIGS. 5A — 5I are wave forms characterizing subcarrier phase demodulation.

Referring now to the drawing, there is shown a specific illustrative signal multiplexed communication system. In overall terms, the communications system propagates a video signal supplied by a source 54 thereof at the system transmitter (FIG. 3), to video signal utilization means 84 at a receiver (FIG. 4), as at base band of a microwave main carrier modulation spectrum. Simultaneously therewith, analog and/or digital information supplied by one or more supplementary signal sources 10 (FIG. 3), are communicated to a like number of supplementary signal receiving means 120 at the system receiver (FIG. 4), the supplementary information being propagated in digital form as differential quadrature phase shift modulation of an above video band carrier. Supplementary signal multiplexing and demultiplexing apparatus is provided if necessary, i.e., if plural supplementary programs are coincidentally communicated.

Figure 3:
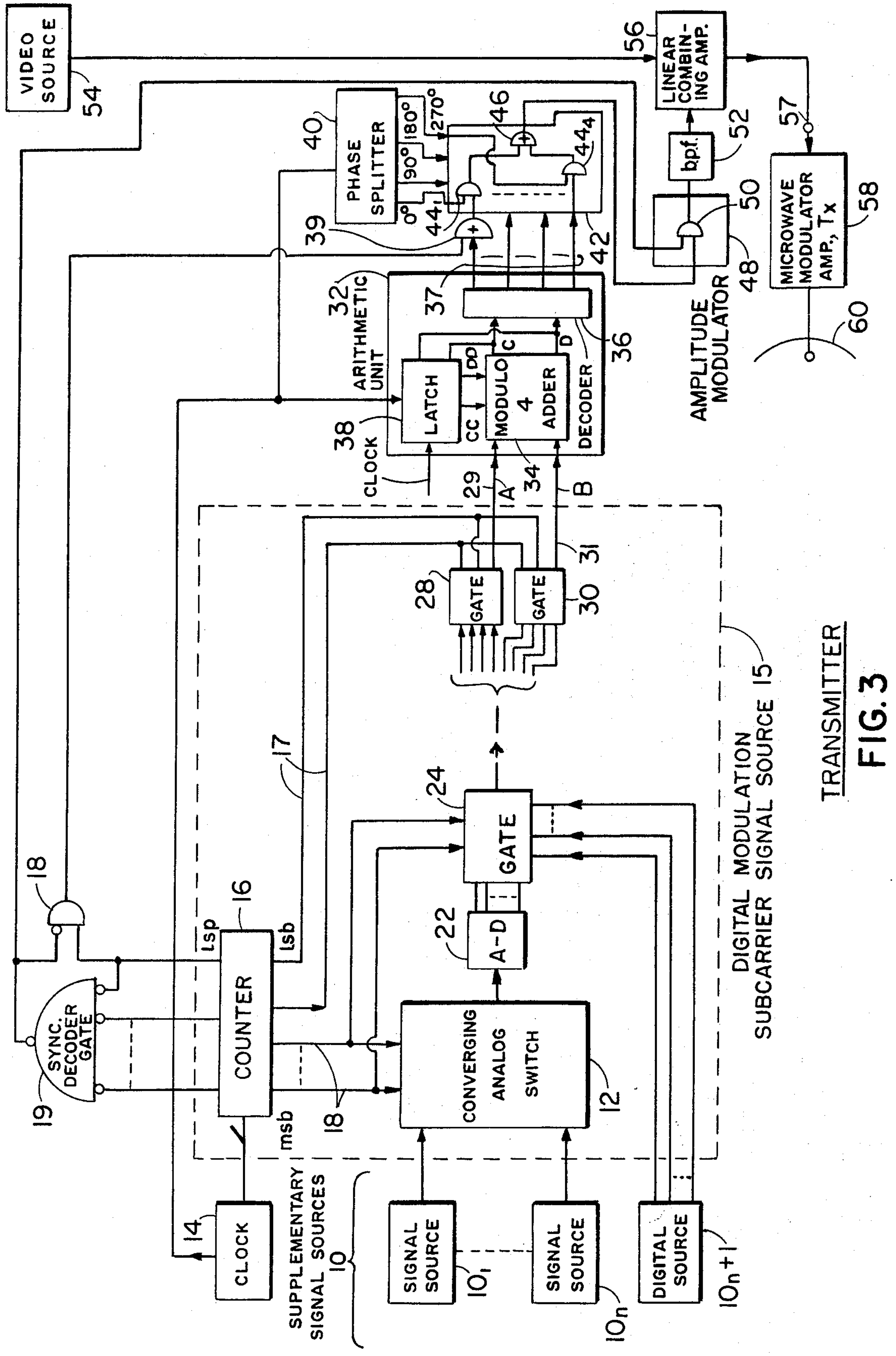
FIG. 3 depicts transmitter apparatus embodying the principles of the present invention.

To effect such communications, we consider first the microwave system transmitter shown in FIG. 3. The transmitter includes modulation-power amplifier apparatus 58 for radiating a frequency modulated microwave main carrier via an antenna 60. This main carrier is deviated in frequency by a composite modulation signal applied at an input modulation port 57. As a first constituent of the modulation spectrum, a video signal is supplied to the modulator 58 by a video source 54 via a linear combining network or amplifier 56. The video signal is of the prescribed form, occupying approximately 4.5 mHz, and is assumed to be at base band (standard video microwave practice).

Figure 1:
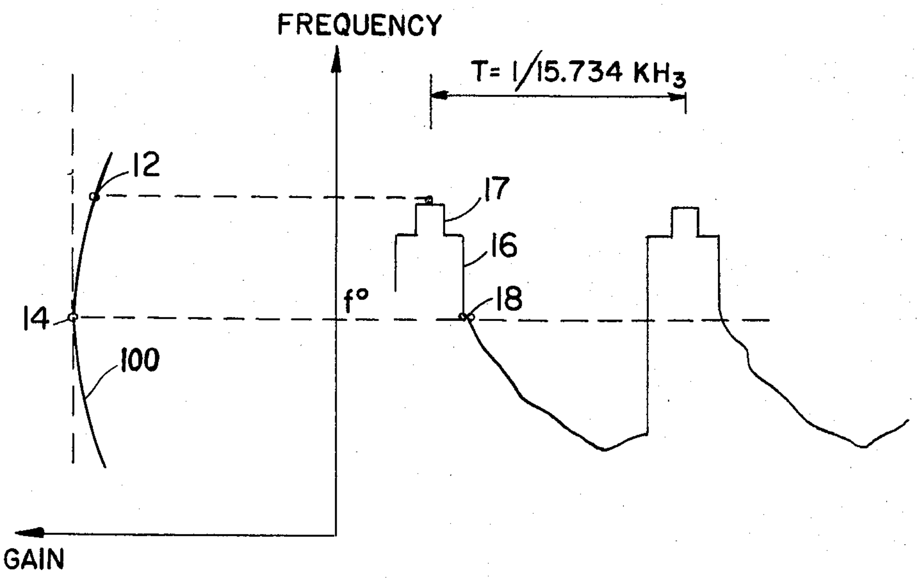
FIGS. 1 and 2 depict the differential gain and phase nonlinearities characterizing microwave transmitters, as above discussed.
Figure 2:
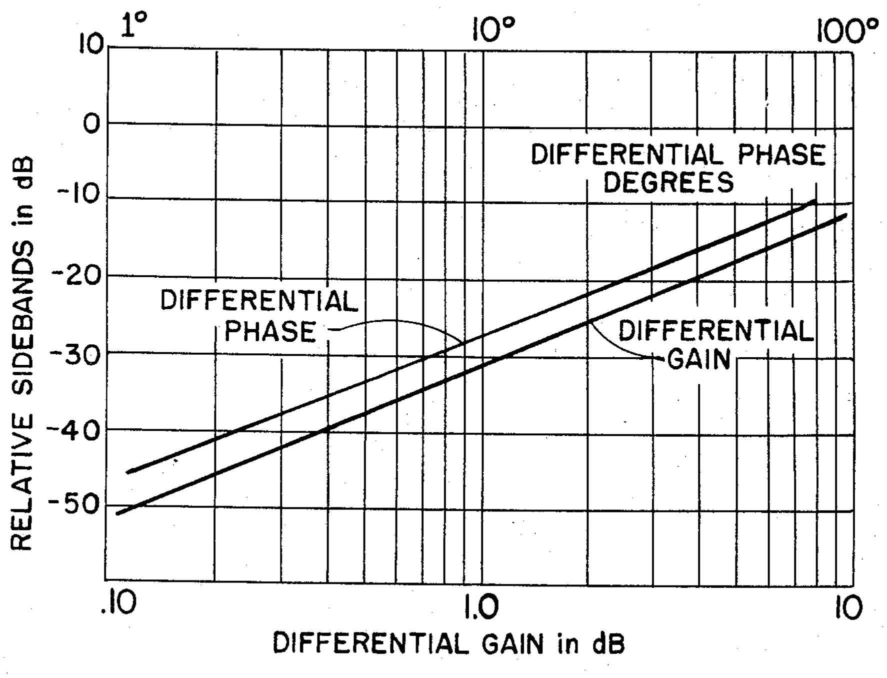

Turning now to the additional, or subcarrier channel, the transmitter apparatus includes a digital subcarrier modulation signal source 15 which supplies two synchronous digital pulse trains via leads 29 and 31 to an arithmetic unit 32. Most simply, the digital information impressed on the leads 29 and 31 may be directly supplied by any digital information source well known to those skilled in the art, i.e., two shift registers loaded in series or parallel, and clocked out in series by a common clock source to develop the requisite time pulse waves. However, for purposes of generality, the specific transmitter structure shown in FIG. 1 employs as a subcarrier modulation signal source 15 plural analog signal source $\mathbf{10}_l - \mathbf{10}_n$, e.g., telephony, radio programming, other audio band signals, facsimile or the like. Further, plural digital sources 10 may be employed as well, one such source $\mathbf{10}_{n+d}$ being included in FIG. 3. Multiplexing and signal conversion apparatus is therefore included in the FIG. 3 transmitter to convert the analog signals to digital form, and to multiplex all input signals supplied by the signal sources $\mathbf{10}_l - \mathbf{10}_{n+l}$ onto the leads 29 and 31 on a time division basis.

For signal multiplexing purposes, the FIG. 3 microwave transmitter includes a master system clock 14 which cycles a counter 16, e.g., a multistage binary ripple counter. The output signals from the counter 16 include plural most significant digits 18 which operatively sample and select for communication a changing one of the supplementary signal sources 10, and least significant bits 17 which convert parallel digital information characterizing the operatively selected signal source 10 to serial form as required for the input lines 29 and 31 to the arithmetic unit 32. Thus, for example, the analog signal sources $\mathbf{10}_l - \mathbf{10}_n$ are supplied to a converging analog switch which sequentially selects and supplies a changing one of the input analog signals to an analog-to-digital converter 22. Thus, the converging analog switch may comprise, for example, an array of FET or other switches in one-to-one correspondence with the signal sources $\mathbf{10}_l - \mathbf{10}_n$, the field effect transistors having interconnected output drain terminals, where the gate of a selecting one of the FET switches is enabled by a decoder responsive to the digital information characterizing the most significant counter 16 output digits 18.

The source 10 sampling affected by the switch 12 under control of the clock-counters 14-16 progresses sufficiently rapidly so that no information supplied by the sources is lost, i.e., more than twice the highest frequency components of the incident intelligence (Shannon's sampling principle).

The analog signal selected by the converging analog switch 12 is converted to parallel digital form by the analog-to-digital converter 22, and the plural digits supplied to a decoder-gate 24 along with the digital information supplied by the digital source(s) $\mathbf{10}_{n+l}$. Depending upon the counter 16 output lines 18, the digital replica of an analog signal or a selected digital word of the source(s) $\mathbf{10}_{n+l}$ is present at the output of gate 24 for one complete cycle for the counter 16 least significant lines 17.

One half of the bits characterizing the digital numbers at the output of the gate 24 are supplied to each of gates 28 and 30, as are the outputs 17 of the least significant stages of the counter 16. Gates 28 and 30 are adapted to serially pass the digital information present at a different one of the input data lines thereto from gate 24 onto the associated output conductor 29 or 31, respectively. Thus, assuming an eight digit format, e.g., an eight digit binary word produced by the analog-to-digital encoder 22 characterizing an analog signal level, or an eight digit word produced by the digital source(s) $\mathbf{10}_{n+l}$, each of the gates 28 and 30 receives four input data lines from the gate 24; two timing lines 17 from the counter 16; and serially impresses four bits during four clock pulse intervals on the lines 29 and 31.

In overall scope the modulation process in accordance with the present invention may be deemed differential quadrature phase. That is, information (in two bit binary format) is modulated on a subcarrier by shifting the phase of the subcarrier between consecutive time slots defined by the clock 14. More particularly, the phase of the subcarrier during a previous clock period is advanced by some integral multiple of $\pi/2$ (90°) depending upon the four possible digital states of the information present on the data lines 29 and 31 during the next clock period. Thus, for example, for information on the lines 29 and 31 of 00, 01, 10, and 11, the previous phase of the carrier may be advanced by 0° (i.e., remain the same), 90°, 180° or 270°, respectively.

At the receiver, as will be more clear from the detailed discussion below, the difference in phase of the subcarrier between consecutive time slots is determined, and this at once yields the two binary digits giving rise to that subcarrier phase change at the transmitter during the modulation process. As already discussed herein, and as reiterated below, such a signal multiplexing procedure provides a very high grade communication channel, approaching the quantizing signal-to-noise ratio for the assumed analog signal multiplexing contact—59db for an eight bit digital encoding, even in microwave systems exhibiting large differential phase non-linearities more particularly, again referring to FIG. 1, it is observed that the absolute amount of differential phase—even if large, does not change rapidly and thus merely serves as a substantially constant phase bias during consecutive time slots at the much higher subcarrier frequency (e.g., hundreds or thousands of kilocycles vis-a-vis the 15.7 KHz video linear rate). Thus, the difference in subcarrier phase during consecutive time slots very closely approximates an integral multiple of $\pi/2$ notwithstanding the presence of large absolute differential phase.

With the above general principles in mind, attention will again be directed to the phase modulated subcarrier channel of the FIG. 3 microwave transmitter. Some intermediate point of clock source 14 (which is assumed to comprise an oscillator and divider) may serve as the basic subcarrier frequency source (an independent subcarrier oscillator unrelated to the clock 14 may be used as well), and is supplied to a phase shifter network 40 which supplies replicas of the basic subcarrier frequency square wave shifted by 0°, 90°, 180° and 270°. The plural phase shifter 40 may comprise cascaded monostable multivibrators, a multitapped delay line, or like structure well known to those skilled in the art.

The function of arithmetic unit 32 is to in essence perform the modulation process, i.e., to shift the phase of the subcarrier from its previous state to a new state which depends upon both the previously obtaining subcarrier phase and upon the input information on lines 29 and 31.

To this end the arithmetic unit 32 includes a two stage latch or register 38 for storing two digits (CC,DD) representing the last subcarrier phase, phase differential information being embodied by the incoming two bits on lines 29 and 31 (A,B).

The arithmetic unit 32 further includes a modulo-4 adder 34 of any construction well known to those skilled in the art for generating two output digits (C.D.) which define the next carrier phase. The output of modulo-4 adder 34 is decoded by a decoder 36, one of four decoder 36 output leads 37 being energized dependent upon the output of adder 34. The energized conductor 37 then enables one of four coincidence gates 44 (e.g., AND gates, NAND gates or the like) to gate the desired one of the four subcarrier phases supplied by the phase splitter network 40 to a linear combining amplifier 56 via a disjunctive logic gate 46 (e.g. OR gate, NOR gate, or the like), an amplitude modulator 48 and a band pass filter 52.

In one form of our invention, the modulo-4 adder may comprise a combinatorial logic network having a truth table given below, where the truth table inputs A, B, C′ and D′ are respectively the lines 29 and 31 and the two outputs of latch 38, and wherein the output of circuit 34 comprises the inputs C and D to the decoder 36.

ARITHMETIC UNIT TRUTH TABLE

| Inputs A | Inputs B | Last State CC | Last State DD | Outputs C | Outputs D |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 1 |
| 0 | 1 | 0 | 1 | 1 | 0 |
| 0 | 1 | 1 | 0 | 1 | 1 |
| 0 | 1 | 1 | 1 | 0 | 0 |
| 1 | 0 | 0 | 0 | 1 | 0 |
| 1 | 0 | 0 | 1 | 1 | 1 |
| 1 | 0 | 1 | 0 | 0 | 0 |
| 1 | 0 | 1 | 1 | 0 | 1 |
| 1 | 1 | 0 | 0 | 1 | 1 |
| 1 | 1 | 0 | 1 | 0 | 0 |
| 1 | 1 | 1 | 0 | 0 | 1 |
| 1 | 1 | 1 | 1 | 1 | 0 |

The conversion of the truth table set forth above to specific gating structure will be readily apparant to those skilled in the art. See, for example, "Switching Circuits and Logical Designs," S.H. Caldwell, John Wiley & Sons Inc. The function of the band pass filter 52 is to limit the subcarrier fundamental frequency plus its modulation products, the square wave subcarrier being converted therein to sinusoidal form.

The modulated subcarrier output of the band pass filter 52 is supplied as the second input to the linear combining amplifier 56. The combined signal spectra at the output of the amplifier 56 then frequency modulates the main microwave carrier and is radiated as above discussed.

As a final system function for the FIG. 3 transmitter, the exact output frequency of the clock 14 and the state (phase) of the counter 15 must be communicated to the receiver to synchronize like clock and counter elements therepresent for time division demultiplexing purposes. To this end, a specific clock state (e.g., all zeros) is decoded by a synchronizing code pulse generating gate 19 is employed to amplitude modulate the phase modulated subcarrier in modulator 48. The modulator 48 may simply comprise an AND gate to effect 100 percent amplitude modulation (subcarrier suppression) during the particular sync clock interval.

It is further desirable that a reference (e.g. zero) phase signal be transmitted immediately following the sync period, i.e., at the beginning of each operative clock-counter time division signal multiplexing cycle. Thus, coincidence gate 18 detects the clock phase following the sync interval and enables the zero phase selecting AND gate $\mathbf{44_1}$ via an OR gate 39 to supply the requisite zero phase subcarrier during this time.

It is again observed with respect to the above discussion that the microwave transmitter 58 is inherently nonlinear, and thus video signal harmonics and differential phase are inherently generated as an incident to the transmission process no matter how pure and distinct the video and subcarrier information bands at the output of the combining amplifier 56.

The signal recovery process will now be discussed with respect to the microwave receiver shown in FIG. 4. A measure of the signal radiated by the transmitter is recovered at a receiver antenna 80, the microwave main carrier demodulated at element 81, and the modulation supplied to a filter 82. A low pass portion of the filter 82 separates the base band video signal which is supplied to video signal utilization means 84 for conventional video distribution and/or display. The subcarrier spectrum is applied by high or band pass structure of the filter 82 to two output paths.

In a first, synchronization enabling path, an amplitude modulation detector 88 provides an output pulse corresponding to the clock interval when the amplitude modulator 48 is enabled by the sync gate 19. This pulse is supplied to a phase comparator 124 of a phase locked loop 122. The phase locked loop 122 operates in a manner well known to those skilled in the art to maintain the output of a voltage controlled oscillator 130 at precisely the rate of the clock 14 of the transmitter and moreover, to maintain the phase of the count in a counter 132 (of the same capacity as the counter 16 at the transmitter) in phase with the counter 16. The phase locked loop has forward gain elements comprising an amplifier 126, a low pass filter 128 and the voltage controlled oscillator 130, and feedback elements comrising the divider 132 and a decoder gate 134 which functions in a manner directly analagous to that of the decoding gate 17 at the transmitter.

The phase modulated subcarrier is also passed to a demodulating path which initially comprises a squaring amplifier 90 to regenerate the square waveform essentially present at the input to the band pass filter 52 at the transmitter. The output of the squaring amplifier 90 is applied to a delay element 92 (e.g., a monostable multivibrator or a delay line) having a delay time equal to one clock interval. The subcarrier output of amplifier 90 is also passed to a phase splitter 94, of a structure such as that of element 40 in FIG. 3, which generates four replicas of the square wave output of squaring amplifier 90 having a phase relationship of 0°, 90°, 180° and 270° with respect thereto. The four phased versions of the output of squaring amplifier 90 (i.e., the incoming phase modulated subcarrier wave) are supplied to a first input of four Exclusive OR gates 96, the other input to the Exclusive OR gates 96 comprising the output of the delay line 92 which represents the phase of the modulator subcarrier during the previous clock interval. A low pass filter 98 is connected to the output of each Exclusive OR gate 96 ( a simple capacitor where the gate 96 provides a high output impedance ) to supply to the input of a following comparator 100 the average value of the output wave of the associated Exclusive OR gate. Finally, a second input of each of the comparators 100 is supplied with a like threshold potential.

As is set forth below, one and only one of the low pass filters 98 will supply to the associated comparator a voltage level which exceeds the threshold potential, and thus only one comparator will switch its output state. The enabled comparator uniquely identifies the two digit binary number which generated the subcarrier phase change between the previous clock interval (represented by the output of the delay line 92) and the presently received subcarrier phase signaled by the output of the squaring circuit 90.

Figures 5A, 5B, 5C, 5D, 5E, 5F, 5G, 5H, 5I:
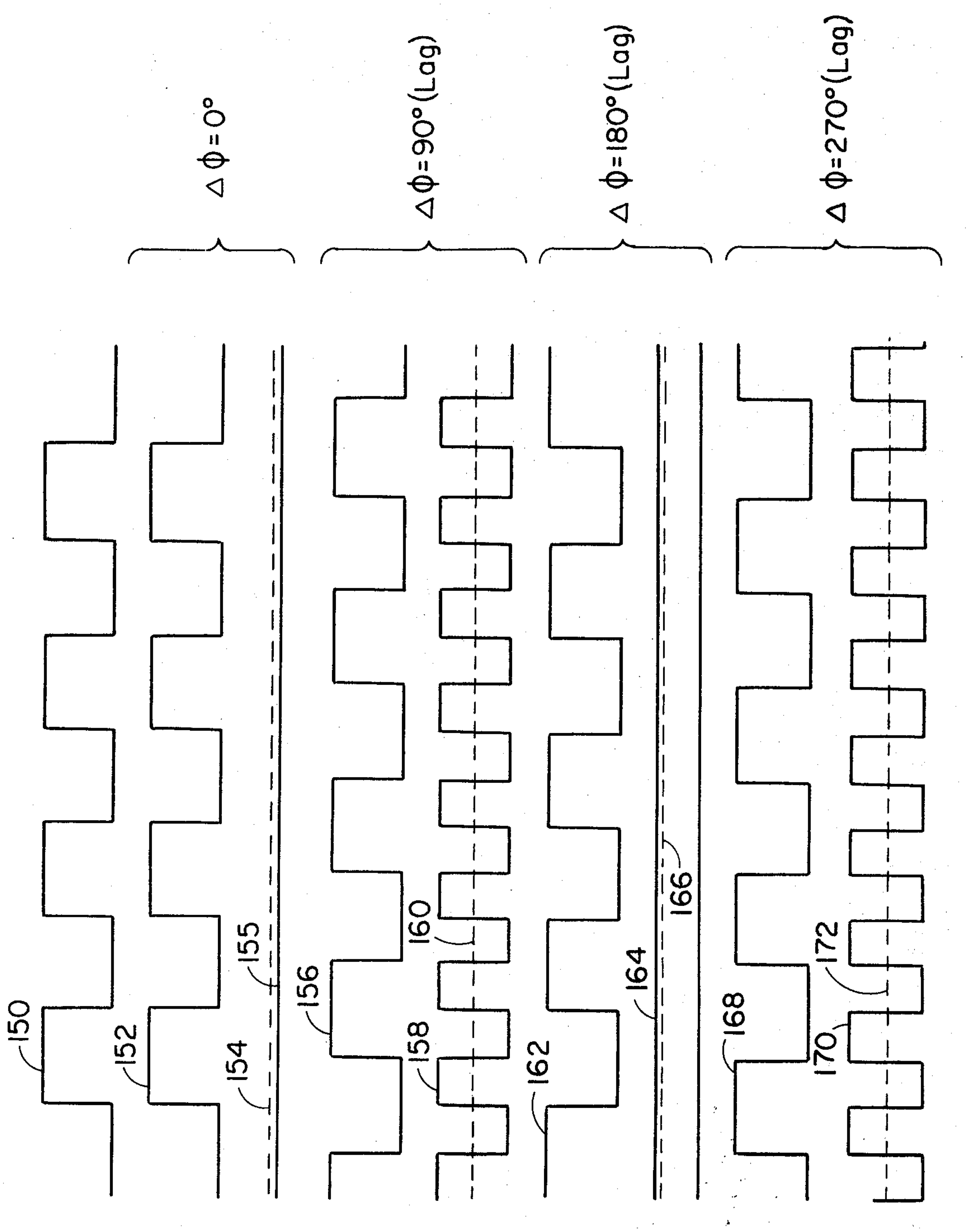

The differential subcarrier phase demodulation process may be more clearly understood with reference to FIGS. 5A – 5I. FIG. 5A depicts a square wave 150 which is assumed to be the output of the delay circuit 92, i.e., the subcarrier phase obtaining during the previous clock period. Correspondingly, the waveforms 152, 156, 162 and 168 depict the four possible output waves for the phase splitter 94 i.e., those differing in phase from the wave train of FIG. 5A by 0°, 90°, 180° and 270°, respectively. The reference wave of FIG. 5A vis-a-vis each of the four conditions of FIGS. 5B, 5D, 5F and 5H will be independently considered below. Before this, however, it will be recalled that the Boolean function effected by the Exclusive OR gates 96 is to provide an output where one and only one of its two input terminals receive a relatively high potential, i.e., to provide the function $X \oplus Y = X'Y + XY'$ of two binary variables X and Y.

Examining first the zero relative phase (FIG. 5A and 5B) case it is observed that at no time is one of the signals 150 or 152 high when the other is not. Accordingly, as shown in FIG. 5C, the output of an Exclusive OR gate 96 operating on the waveform 150 and 152 for the zero difference case is always zero (solid line 155 in FIG. 5C), as is the average value of the waveform 155 taken by a following low pass filter 198 (dashed waveform 154). Thus, a zero valued signal 154 is supplied to the comparator 100 which does not switch, this incoming signal being less than the threshold potential supplied to the other comparator input.

The case for a 90° phase difference for Exclusive OR gate inputs may be considered by comparing FIGS. 5A and 5D, wherein the waveform 156 leads the waveform 150 by 90 electrical degrees. The output of an Exclusive OR gate receiving the signals 150 and 156 is shown by the waveform 158 in FIG. 5E, and has an average value shown by the dashed line 160 - one-half of its peak amplitude. A similar average value 172 (FIG. 5I) results for the 270° phase shift case. Compare FIG. 5A, 5H and 5I with FIGS. 5A, 5D and 5E. This one-half peak average value is similarly made insufficient to switch a comparator 100.

We turn now to the situation where the phase difference between waves supplied to an Exclusive OR gate 96 is 180° as shown by the waveforms 150 and 162 of FIGS. 5A and 5E. For this case, the output 164 (FIG. 5G) of the Exclusive OR gate 96 remains at peak level, as does also the average value 166 of this signal. The threshold of the comparators 100 is set to a level between the one-half peak and peak amplitude levels 160 – 172 (FIGS. 5E and 5I) and the peak level 166 (FIG. 5G). Thus, only the demodulation channel supplied with signals varying by 180° (or nearly so) yields an output indication.

Accordingly, differential phase demodulation is made possible, and is in fact effected, by determining which one of the four phase versions of the present subcarrier output of the squaring amplifier 190 is 180° electrical degrees out of phase with the previous subcarrier phase present at the output of delay element 92, that is, which one (and only one) of the comparators 100 supplies a high output potential. More specifically, and returning to FIG. 4, if the output of comparator $\mathbf{100_{10}}$ is high, this signals that the output of the squaring amplifier 90 is 180 out of phase with the output of delay element 92. This, of course, directly reveals that a "10" information pattern was present at the phase modulator input lines 29 and 31 during subcarrier modulation and thus, without more, completes the intelligence demodulation process. Similarly, some reflection will show that a high output voltage for the comparators $\mathbf{100_{00}}$, $\mathbf{100_{11}}$, and $\mathbf{100_{01}}$ respectively arise when the subcarrier modulating intelligence was "00", "11" or "01", respectively.

To complete the subcarrier demodulation and demultiplexing procedure for the specific apparatus shown in the drawing, the outputs of the comparators 100 are strobed during the mid portion of a time slot ( when transient noise has abated) into registers 104 via AND gates 102 and a strobe circuit 136 which may comprise a one shot multivibrator and a differentiator. Thus, one and only one of the registers 104 will have a one stored therein at any particular time.

The outputs of the registers 104 are supplied to a decoder 106 which responds to a binary one at one of its input lines by providing output Boolean variables AA and BB which identically correspond to the variables A and B at lines 29 and 31 during the signal modulating process. For the specific assumed differential phase modulation pattern, OR gates 108 and 110 connected as shown will suffice for this purpose, i.e., will supply AA — BB signals 10, 00, 11, and 01 when energized by the registers $\mathbf{104_{10}}$, $\mathbf{104_{00}}$, $\mathbf{104_{11}}$ and $\mathbf{104_{01}}$ respectively.

The serial wavetrain signals AA and BB are demultiplexed to arrive at the output utilization means 120 in a manner well known to thosed skilled in the art, and essentially comprising the inverse of the time division multiplexing process affected at the transmitter. In particular, and under control of the counter 132 which runs in syncronism with the counter 16 at the transmitter, the incoming information AA — BB is gated by a signal distribution switch 112 into output holding latches $114_i$ associated with each of the output utilization means $120_i$. For each analog signaling path, the output of a latch $114_i$ is supplied to a digital-to-analog converter $116_i$, passed through a low pass filter - the original analog signal being reconstructed thereby, and supplied to any appropriate output utilization means $120_i$. Correspondingly, the output of the latch associated with any digital communication path is simply coupled for parallel entry into digital output utilization means 120.

The above arrangement has thus been shown to provide for base band video transmission, and to provide a wide band subcarrier information propagating capacity which may be used as such, or which may employ time division principles to simultaneously communicate plural independent intelligence messages of analog or digital form. It is again observed that the subcarrier communication channel is of a very high grade, notwithstanding severe non-linearities characterizing the microwave modulation process.

The above described arrangement is merely illustrative of the principles of the present invention. Numerous modifications and adaptations thereof will be readily apparent to those skilled in the art without departing from the spirit and scope of the present invention. Thus, for example, while the specific apparatus discussed above employed quadrature differential phase modulation (two parallel data streams or incoming lines 29 and 31 to the modulator 32 giving rise to $2^2$ or 4 phase changes), any number of phase differential conditions may be employed. Thus, a single data stream may selectively effect a 0° or 180° phase change; or $n$ parallel synchronous data lines may implement one of $2^n$ phase changes, typically spaced by $\pi 2^{n-1}$ radians. As the number of allowable phase states increases, however, demodulation margins decrease.

What is claimed is

1. In combination in multiplexed communications apparatus, transmitter means for radiating a modulated main carrier, said main carrier modulating spectrum comprising a base band signal and a subcarrier channel, said transmitter including a modulator characterized by significant phase non-linearities when operated over a substantial part of its operating range, means for supplying said base band signal to said modulator for operating said modulator over said substantial part of its operating range, and means for supplying said subcarrier channel signal to said modulator, said subcarrier signal being substantially smaller in amplitude than said base band signal, said subcarrier channel supplying means comprising means for generating plural distinct subcarrier phases, digital intelligence supplying means, controlled gating means for gating a selected one of said subcarrier phases to said modulator, means for storing information identifying the subcarrier phase supplied to said modulator, and arithmetic means responsive to the stored contents of said storing means and to the digital intelligence supplied by said supplying means for selectively controlling said controlled gating means.

2. In combination as in claim 1 wherein said transmitter further comprises a clock, a digital counter cycled by said clock, logic decoding means connected to said counter, and means responsive to said digital decoding means for selectively modulating said subcarrier channel.

3. A combination as in claim 1 wherein said transmitter digital intelligence supplying means includes time division multiplexing means for supplying digital information to said arithmetic means.

4. A combination as in claim 1, wherein said plural subcarrier phase supplying means supplies four distinct subcarrier phases each separated by 90 electrical degrees.

5. A combination as in claim 1 further comprising receiver means, said receiver means comprising filter means for separating said video and said subcarrier signals, and subcarrier phase demodulator means, said demodulator means including means for determining the difference in phase of the received subcarrier during consecutive periods of time.

6. A combination as in claim 5 wherein said subcarrier demodulator means comprises delay means, phase splitter means, and plural Exclusive OR logic means each receiving the output of said delay means and a different phase supplied by said phase splitter means.

7. A combination as in claim 6 further comprising plural signal averaging means each connected to the output of a different one of said Exclusive OR logic means, and means for determining which of said plural signal averaging means exhibits the largest output potential.

8. A combination as in claim 5 wherein said transmitter digital intelligence supplying means comprises plural signal sources and time division multiplexing means for sequentially connecting a measure of the signals supplied by said signal sources to said arithmetic means, and wherein said receiver includes time division demultiplexing means for separating recovering said signals supplied by said plural signal sources at said transmitter.

9. A combination as in claim 8 further comprising clock means at said transmitter, said receiver including phase locked loop means for producing an output wave of like frequency as that supplied by said clock means.

10. A combination as in claim 9 wherein said transmitter includes counter means cycled by said clock means, and said phase locked loop includes counter means of a capacity corresponding to that of said transmitter counter means.

11. A combination as in claim 10 wherein said transmitter further comprisis means responsive to a reference state of said transmitter counter means for amplitude modulating said subcarrier signal, and wherein said receiver includes amplitude modulation detector means for signalling said phase locked loop means.

12. In combination in multiplex microwave communication apparatus, a microwave frequency modulator, said modulator being characterized by significant phase non-linearities when deviated over a substantial portion of its transfer characteristic, means for supplying a microwave main carrier frequency deviating modulating potential to said modulator, said microwave deviating potential comprising a relatively large amplitude base band video signal which operates said modulator over said substantial portion of its transfer characteristic, said modulating potential supplied by said supplying means also including a differential phase modulated subcarrier, said modulated subcarrier being substantially higher in frequency than said base band video signal and being substantially smaller in amplitude than said video signal, means for supplying said video signal to said modulator deviating potential supplying means, and means for supplying said differential phase modulated subcarrier to said modulator deviating potential supplying means, said modulated subcarrier supplying means comprising digital differential subcarrier phase modulating means.

13. A combination as in claim 12 wherein said differential phase subcarrier modulating means comprises means for producing plural subcarrier signals of like frequency but which differ in phase, controlled gate means for selectively gating one of said subcarrier phases to said modulator deviating potential supplying means, digital information supplying means, and arithmetic unit means for selectively enabling said controlled gating means responsive to the incoming digital information supplied by said source thereof and further responsive to digital information representative of the instantaneous carrier phase gated to said main carrier deviating potential supplying means.

14. A combination as in claim 13 wherein said digital information supplying means comprises at least one analog signal source, analog-to-digital converting means, and means for converting parallel digital signals to serial form.

15. A combination as in claim 13 wherein said digital information supplying means comprises plural signal sources, time division multiplexing means for sampling said signal sources means for converting said analog signals to digital form, and means for serially supplying digital information to said arithmetic means.

16. A combination as in claim 13 wherein said digital information supplying means supplies two synchronous serial binary wave trains, and wherein said plural phase subcarrier producing means comprises means for producing four subcarrier phases separated by $\pi/2$ radians.

17. A combination as in claim 12 further comprising receiver means for receiving the modulated main microwave carrier, receiver means including means for separating said base band video and said modulated subcarrier signals, and means for demodulating said modulated subcarrier, said demodulating means comprising means responsive to the difference in phase of said subcarrier during consecutive time periods for signalling the modulating intelligence.

18. A combination as in claim 17 wherein said modulated subcarrier demodulating means comprises Exclusive OR means for comparing plural phase versions of the modulated subcarrier during one time period with the phase of the carrier during an adjacent time period.

* * * * *